Figure 1:
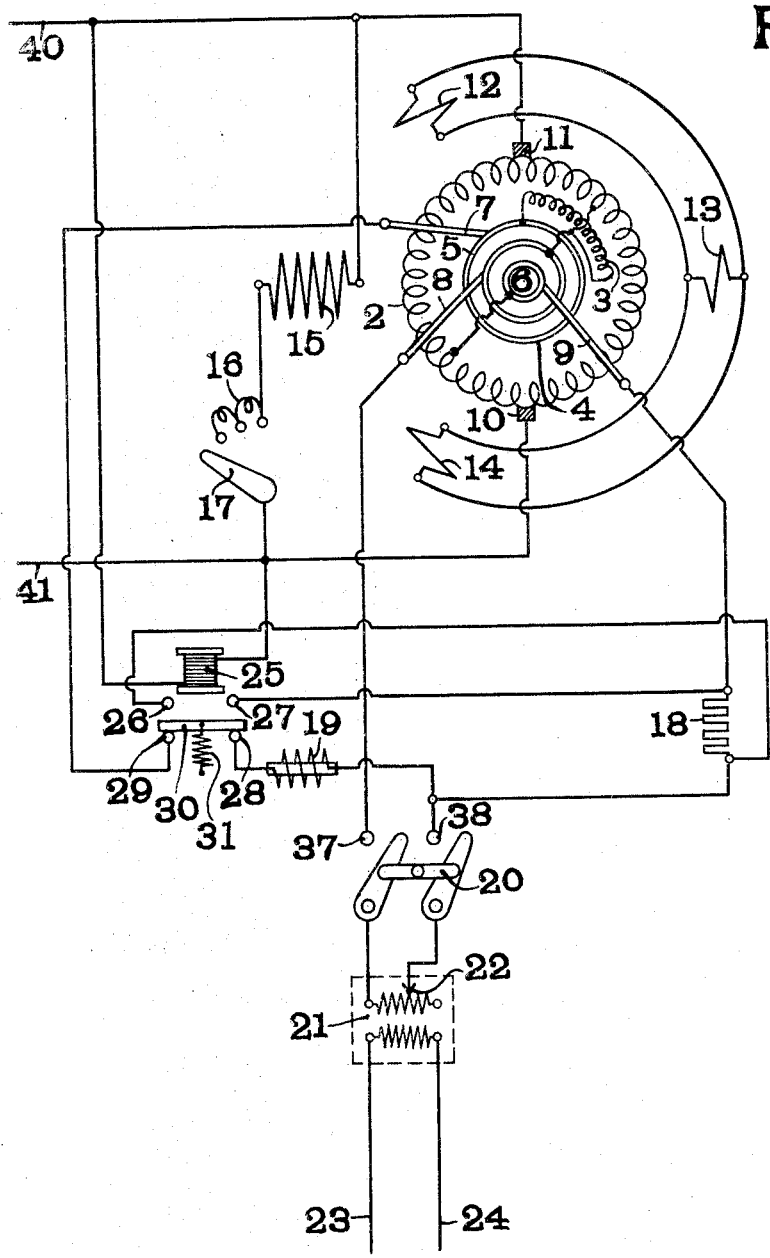

V. A. FYNN.
ROTARY CONVERTER.
APPLICATION FILED MAY 23, 1911.

1,044,641.

Patented Nov. 19, 1912.
2 SHEETS—SHEET 1.

WITNESSES:
L. L. Mead
W. H. Alexander,

INVENTOR
Valère A. Fynn,
BY
E. E. Hoffman
ATTORNEY

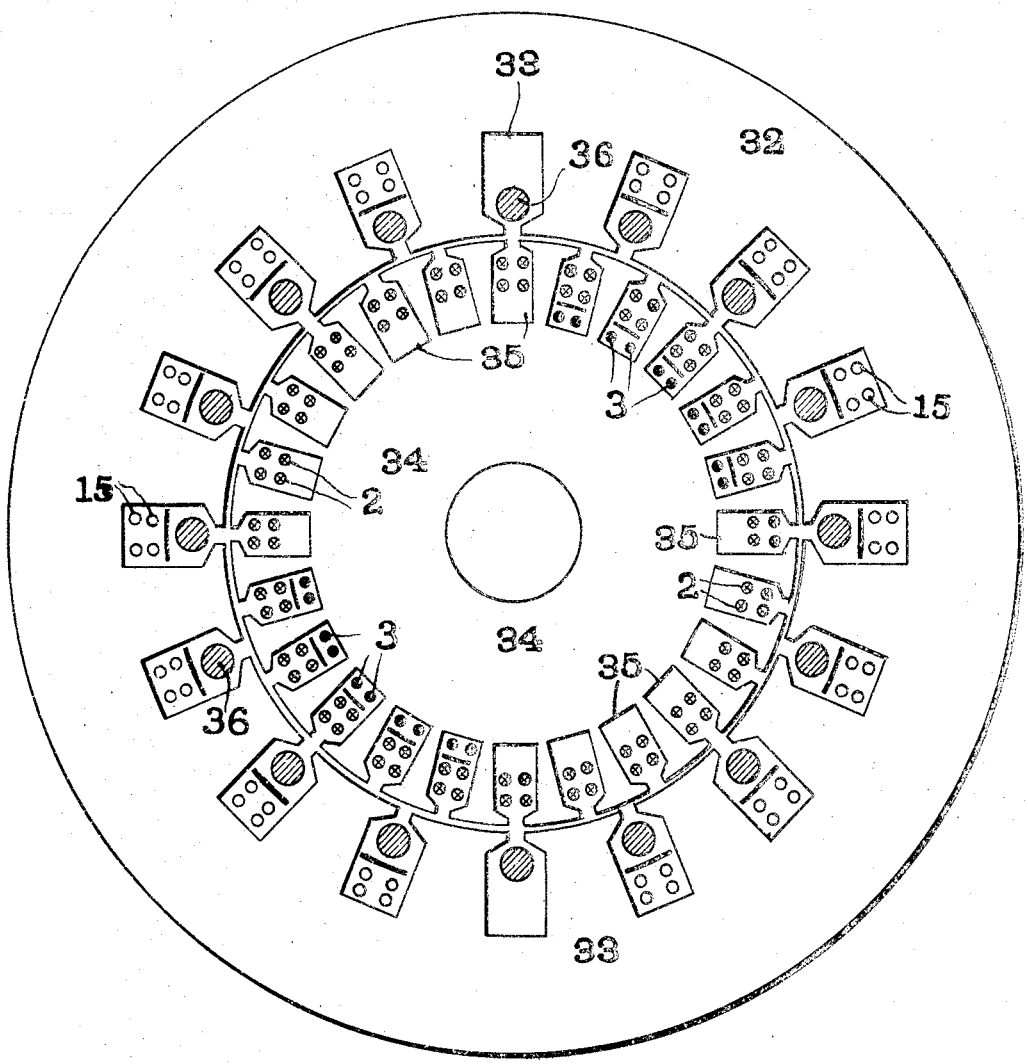

UNITED STATES PATENT OFFICE.

VALÈRE ALFRED FYNN, OF LONDON, ENGLAND.

ROTARY CONVERTER.

1,044,641.

Specification of Letters Patent.  Patented Nov. 19, 1912.

Application filed May 23, 1911. Serial No. 628,900.

*To all whom it may concern:*

Be it known that I, VALÈRE ALFRED FYNN, a subject of the King of England, residing at London, England, have invented a certain new and useful Rotary Converter, of which the following is such a full, clear, and exact description as will enable any one skilled in the art to which it appertains to make and use the same, reference being had to the accompanying drawings, forming part of this specification.

My invention relates to improved means for starting rotary converters and has particular reference to single phase converters intended to be started from the alternating current side.

It is well known that such machines are very difficult to start, and although a number of successful schemes have been proposed they all involve the use of the commutator for the purpose of starting and therefore necessitate a somewhat complicated change in the connections before the machine is ready to convert alternating into direct current, or vice versa. Furthermore such changes have always been made by hand. According to this invention I reduce the switching operations to a minimum, do not rely on the commutator for the production of a starting torque, and provide novel, electrically operated and automatic means for changing from the starting to the running connections.

My invention will be better understood by reference to the accompanying diagrammatic drawings representing a 2-pole converter in which—

Figure 1 shows the preferred scheme of connections, while Fig. 2 illustrates the preferred mechanical construction of the magnetic circuit and indicates the space location of the several stator and rotor windings.

It will be convenient for the purpose of description to simultaneously refer to both figures of the drawing, since Fig. 2 is merely a detailed presentation of some of the parts diagrammatically indicated in Fig. 1.

The rotor 34 carries two windings, the main winding 2 which is connected to a commutator and to the slip rings 5 and 6, and an auxiliary winding 3 connected at one end to the slip ring 5 and at the other to an independent slip ring 4. The main winding 2 is of the commuted type and is uniformly distributed over the whole rotor circumference, conductors belonging to said winding being placed in each of the rotor slots 35. The auxiliary winding 3 is distributed over a part only of the rotor circumference, being placed in only a few of the rotor slots, as shown in Fig. 2. This auxiliary winding is only used during the starting period and may therefore consist of a comparatively thin wire. Connection between the slip rings and the outer circuits is made in the usual manner by way of the brushes 7—8 and 9. Brushes 10 and 11 rest on the commuted winding 2 or on the commutator belonging to said winding and are connected to the shunt exciting winding 15 disposed on the stator and displaced by about 90 electrical degrees with respect to the brush line 10—11. The stator also carries a polyphase short-circuited winding which may be of the squirrel cage type. In Fig. 1 this short-circuited winding is shown as a three phase winding 12—13—14, while Fig. 2 indicates a squirrel cage winding 36 in place thereof. A regulating resistance 16 controlled by the switch 17 is provided in the shunt exciting circuit. The slip ring 5 connected to the main rotor winding is also connected by way of the brush 8 to point 37 of the main switch 20. The other slip ring 6 connected to the main rotor winding is connected to point 38 of the main switch 20 by way of the brush 9 and the ohmic resistance 18. The auxiliary slip ring 4 is connected to point 38 of the main switch 20 by way of the brush 7, the contacts 29—28 of the automatic switch and the impedance 19.

The automatic switch just referred to consists of an electromagnet connected in parallel to the commutator brushes 10—11 and controlling an armature 30, which is normally held in contact with the points 29 and 28 by means of the spring 31, but which when attracted by the electromagnet 25 leaves the points 29—28 and connects the points 26 and 27. The main switch 20 merely connects the adjustable ratio transformer 21 to the contacts 37 and 28. The primary of the transformer 21 is connected to the mains 23—24.

The operation of this improved starting arrangement is as follows: When at rest the armature 30 of the automatic switch 25 is in the position indicated in Fig. 1 and the shunt switch 17 is preferably left open, although it may be closed, if desired. In order to start the converter from the alternating current side it is only necessary to close the main switch 20. The combination of the main rotor winding 2, the auxiliary rotor winding 3, the ohmic resistance 18 and the impedance 19, with the polyphase short-circuited winding 12—13—14 of the stator enables the machine to start with a sufficiently powerful torque, the machine then operating as a split-phase motor. The voltage appearing at the commutator brushes 10—11 will be an alternating voltage of the full periodicity of the supply as long as the machine is at rest. As the machine gathers speed the periodicity of that voltage will gradually diminish, and when the machine has reached a synchronous speed the voltage at the brushes 10—11 will be uni-directional and its order of magnitude will be very near that which it has in normal operation. I make use of this variation in the nature and magnitude of this voltage for operating my automatic switch. In order to make the automatic switch 25 suitably responsive to the voltage appearing at the commutator brushes and impressed on the winding of its electromagnet 25, I make the magnetic circuit of said switch of laminated iron and provide its coil 25 with a large number of turns for the purpose of increasing the impedance of the automatic switch to such an extent that an alternating E. M. F. of line periodicity will be unable to send an appreciable current through the electromagnet 25 and will consequently be unable to attract the armature 30. The dimensioning of the electromagnet in the manner described will, however, not prevent a uni-directional E. M. F. or one of a very low periodicity from sending through said magnet a current, the magnitude of which is only or mainly determined by the ohmic resistance of the circuit. I consequently select that ohmic resistance of the circuit in such a way that the E. M. F. available at the brushes 10—11 at the time when the machine reaches a speed in the neighborhood of the synchronous is amply sufficient to attract the armature 30, thus interrupting the auxiliary or starting circuit containing the impedance 19 and short-circuiting the ohmic resistance 18 in circuit with the main slip ring 6 at starting. It is seen that the use of the automatic switch described, reduces the necessary manipulations to the closing of the main switch 20 since the shunt switch 17 may, as has already been pointed out, be closed before the converter is started. Should this shunt switch not be closed before the converter is started then the machine will run up to speed as before and the automatic switch will operate in the manner described, but the converter will not be in a position to deliver direct current to the mains 40—41 until the shunt switch has been closed. This shunt switch can also be utilized for the purpose of adjusting the power factor of the converter.

My invention in its broadest aspect, therefore, consists of the use in connection with a rotary converter, of an automatic switch controlled by an electromagnet connected to a winding on the converter and responsive only at speeds in the neighborhood of the synchronous, said switch being made use of for the purpose of changing the starting connections to the running connections. As applied to a single phase converter my invention consists of a special arrangement of rotor windings which may be combined with the automatic switch herein described.

My invention is of course applicable to machines with any number of pole pairs.

I do not wish to limit myself to the particular embodiment of my invention as herein described, but aim to cover by means of the appended claims all the modifications which fall within the scope of said invention.

Having fully described my invention, what I claim as new and desire to secure by Letters Patent of the United States, is:

1. In a rotary converter, the combination with a stator, of a rotor provided with a commuted winding and another winding distributed over a part only of the rotor circumference, two slip-rings connected to the commuted winding, and a third slip-ring connected to the other rotor winding.

2. In a rotary converter, the combination with an alternating current source, of a stator, a rotor provided with a commuted winding and another winding distributed over a part only of the rotor circumference, a commutator, two slip rings connected to the commuted winding, one slip ring connected to the other rotor winding, and phase displacing devices connected to the source and to the slip rings.

3. In a rotary converter, the combination with an alternating current source, of a stator, a rotor provided with a commuted winding and another winding distributed over a part only of the rotor circumference, a commutator, two slip rings connected to the commuted winding, one slip ring connected to the other rotor winding, phase displacing devices connected to the source and to the slip rings, and an automatic switch operated by a current derived from the converter for rendering the phase displacing devices inoperative.

In testimony whereof, I have hereunto set my hand and affixed my seal in the presence of the two subscribing witnesses.

VALÈRE ALFRED FYNN. [L. S.]

Witnesses:
W. A. ALEXANDER,
ELIZABETH BAILEY.